US005493955A

United States Patent [19]
Belongia et al.

[11] Patent Number: 5,493,955
[45] Date of Patent: Feb. 27, 1996

[54] AUTOMATIC BREADMAKER WITH LATERALLY-OPENING WIDE DOOR

[75] Inventors: David C. Belongia, West Bend; Annette T. Klein, Jackson, both of Wis.

[73] Assignee: The West Bend Company, West Bend, Wis.

[21] Appl. No.: 328,507

[22] Filed: Oct. 25, 1994

[51] Int. Cl.⁶ .................................................. A47J 27/00
[52] U.S. Cl. .................. 99/348; 99/341; 99/352; 126/194
[58] Field of Search .................... 99/348, 341, 352; 126/21 A, 190, 194

[56] References Cited

U.S. PATENT DOCUMENTS

| | | | |
|---|---|---|---|
| D. 183,216 | 7/1958 | Johnson et al. | D7/94 |
| D. 305,856 | 2/1990 | Iwahashi | D7/351 |
| 2,415,711 | 2/1947 | Sticelber . | |
| 2,478,253 | 8/1949 | Doner | 99/341 |
| 2,502,685 | 4/1950 | Warner | 99/341 |
| 2,622,760 | 12/1952 | Kissig | 99/645 |
| 3,065,326 | 11/1962 | Crease et al. | 219/35 |
| 4,415,799 | 11/1983 | Tanaka et al. | 99/468 |
| 4,538,509 | 9/1985 | Oijima et al. | 99/348 |
| 4,776,265 | 10/1988 | Oijima | 99/348 |
| 4,870,896 | 10/1989 | Asahina et al. | 99/348 |
| 4,951,559 | 8/1990 | Arao et al. | 99/348 |
| 4,984,512 | 1/1991 | Takahaski et al. | 99/327 |
| 5,054,383 | 10/1991 | Cho | 99/327 |

OTHER PUBLICATIONS

Author: American Harvest, Chaska, MN 55318 Date: Sep., 1994.

*Primary Examiner*—David Scherbel
*Assistant Examiner*—Reginald L. Alexander
*Attorney, Agent, or Firm*—Jansson & Shupe, Ltd.

[57] ABSTRACT

An automatic breadmaker has a floor, enclosing surfaces and a door which form the oven chamber. The door swings horizontally to create a front opening extending substantially to the oven floor, thus facilitating "wide-side" insertion and removal of the baking pan. When closed, the door extends upwardly from along the oven floor and rearwardly to a position directly above the pan. With the door open, insertion and removal of the pan is further facilitated by the resulting wide-mouth configuration. The pan has two driven kneading members spaced along its bottom for mixing dough. The loaf made by the new breadmaker is of normal configuration, has a risen topside extending along its length and has a size, shape and overall appearance closely resembling that of a normal bakery loaf.

17 Claims, 7 Drawing Sheets

AUTOMATIC BREADMAKER WITH LATERALLY-OPENING WIDE DOOR

FIELD OF THE INVENTION

This invention is related generally to food apparatus and, more particularly, to breadmakers.

BACKGROUND OF THE INVENTION

Automatic breadmakers for home use are becoming increasingly popular, in part because the user is able to prepare specialty and custom loaves of bread of a type not available or not readily available at commercial outlets. Another reason for the popularity of such breadmakers is that bread can be consumed when warm, i.e., immediately at the conclusion of baking. Warm, freshly baked bread has a unique aroma and texture that adds to dining pleasure.

There are a number of examples of automatic breadmakers in the patent literature. U.S. Pat. Nos. 4,415,799 (Tanaka et al.); 4,776,265 (Ojima); 4,836,683 (Aoyama); 4,870,896 (Asahina et al.); 4,903,587 (Nagasaka et al.); 4,977,822 (Seo et al.) and 4,984,512 (Takahashi et al.) depict but a few. In some, like the breadmaker of the Ojima patent, there is no way to view the inside of the baking chamber with the lid closed. Others like those of the Tanaka et al., Takahashi et al. and Nagasaka et al. patents have viewing windows.

Despite the growing popularity of automatic breadmakers, they produce a loaf of bread which only modestly resembles the size, shape and appearance of a normal bakery loaf. For example, the breadmakers shown in the Asahina et al. and Seo et al. patents have upright rectangular "can-like" containers with top lift-off lids. In fact, with their upright dough containers, single bottom kneading paddles and top lids, such breadmakers resemble blenders used to mix liquids or chop food. Such breadmakers produce a loaf of bread which, in cross-section along a plane normal to the upright long axis of the loaf, is square or substantially so.

Further, the dimensional proportions of the loaf made using, e.g., the Asahina et al. and Seo et al. breadmakers are unusual. Such loaves are substantially cubic. A loaf made using the Ojima or Aoyama breadmaker is cylindrical and, therefore, even more unusual —and more difficult to slice or to toast in a conventional toaster which accommodates "rounded-side" rectangular slices from a normal bakery loaf.

Yet another undesirable aspect of known automatic breadmakers is that the upright dough-containing pans thereof (or, perhaps more accurately, "cans") are devoid of kneading paddles sufficient in number and location to mix dough in a long horizontal pan.

Still another feature of known breadmakers is that they do not accommodate (or at least do not easily accommodate) "wide-side" insertion and removal of a bread pan through a wide-mouth opening. For example, the Tanaka et al. patent depicts a breadmaker having a flat, vertical door which swings in a vertical direction about a horizontal axis. When such breadmaker is at counter height (as breadmakers usually are), the user must stoop and reach to place or remove a bread pan.

The breadmaker of U.S. Pat. No. 4,844,048 (Aruga et al.) has a flat, horizontal top-opening lid hinged at the rear and including a view window. A top-opening lid often precludes using the breadmaker on a counter top having cupboards thereabove —there simply isn't clearance to open the door. And the pan must be placed and removed from the top.

To put it another way, the breadmakers of the Tanaka et al. and Aruga et al. patents do not have an oven chamber opening permitting both front and top access to such chamber. Such breadmakers do not permit "angled-and-down" pan insertion into the chamber.

U.S. Pat. Nos. D183,216 (Johnson et al.), 2,478,253 (Doner), 2,502,685 (Warner), 4,903,587 (Nagasaka et al.) and 4,984,512 (Takahashi et al.) show cooking apparatus with various door arrangements including an angled "wrap-around" door which hinges upward (the Johnson et al. patent), a hood-like door which pivots upward (the Doner patent) and curved or plural-plane top-hinged doors (the Warner, Nagasaka et al. and Takahashi et al. patents.) Such door arrangements need extra counter-to-cupboard clearance or impair easy access to the apparatus interior.

An improved breadmaker overcoming some of the problems and disadvantages of the prior art and producing a loaf of bread having a configuration like that of a normal bakery loaf would be an important advance in the art.

OBJECTS OF THE INVENTION

It is an object of this invention to provide an improved breadmaker overcoming problems in the art, including those mentioned above.

Another object of this invention is to provide an improved breadmaker for producing a loaf of bread having a configuration like that of a normal bakery loaf.

Another object of this invention is to provide an improved breadmaker for producing a loaf of bread having a length significantly greater than its height.

Still another object of this invention is to provide an improved breadmaker for producing a loaf of bread having a risen topside extending along its length.

Another object of this invention is to provide an improved breadmaker configured to permit angle-and-down wide-side insertion and removal of a bread pan.

Another object of this invention is to provide an improved breadmaker permitting "wide mouth" top and front access to the oven chamber.

Another object of this invention is to provide an improved breadmaker having a configuration and arrangement minimizing the height of such breadmaker.

These and other important objects of the invention will become apparent from the following descriptions and from the drawing.

SUMMARY OF THE INVENTION

The invention involves an automatic breadmaker of the type having a base with a motor secured to it and drive means linked to the motor for powering a dough kneading member. The chamber is formed by the floor and by fixed enclosing surfaces and an access door. A pan in the oven chamber has a kneading member therein linked to the drive means.

In the improvement, the access door is pivotable about a substantially vertical axis and is swingable in a substantially horizontal direction to open and close the oven chamber. The door is movable to the open position to create a front opening extending substantially to the oven floor. Such front opening makes it easy for the user to insert and remove the pan.

When closed, the access door extends upwardly from along the oven floor and rearwardly to a position directly above the pan. When the door is so configured (and when such door is open), "wide-side" insertion and removal of the pan is further facilitated. And for convenience, the access door includes a window allowing a user to view kneading and baking operations.

The pan of the new breadmaker has a bottom which is longer than it is wide and the oven floor and the access door are each wider than the length of the pan. Such dimensional features and relationships minimize the height of the breadmaker and accommodate wide-side insertion of the pan into the oven chamber.

The pan has a pair of the kneading members within it and spaced along the length of the pan. During ingredient mixing, dough in the pan will be reached by one or both of the kneading members as such members rotate in a horizontal plane near the pan bottom.

This arrangement facilitates automatic preparation of a loaf of normal configuration, having a risen topside extending along its length. Such a loaf closely resembles a normal bakery loaf in size, shape and overall appearance. As a consequence, the new breadmaker is more appealing to users since its product more closely resembles the "standard" product than does a loaf produced by any known prior art breadmaker.

Further details of the new breadmaker are set forth in the following detailed description and in the drawing.

DETAILED DESCRIPTIONS OF THE PREFERRED EMBODIMENTS

In this specification, the term "length" means a dimension measured generally left-right as viewed in FIGS. 1, 2, 3 and 4. The term "width" means a dimension measured generally front-rear as viewed in FIG. 1 or measured generally up-down as viewed in FIG. 3. The terms "height" or "depth" means a dimension measured generally up-down as in FIGS. 1, 2 and 4.

Figure 1:
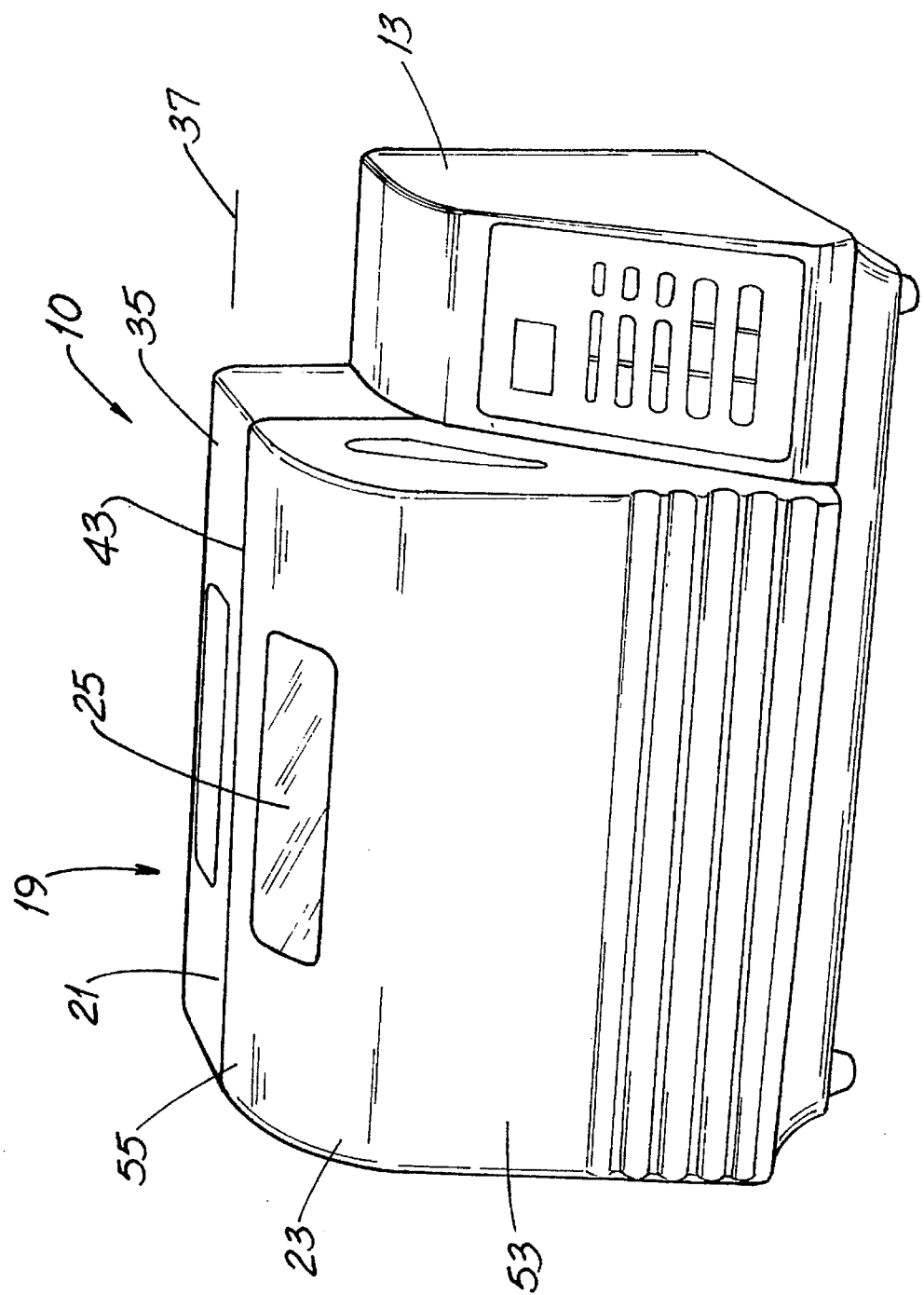
FIG. 1 is a perspective view of the new breadmaker.
Figure 2:
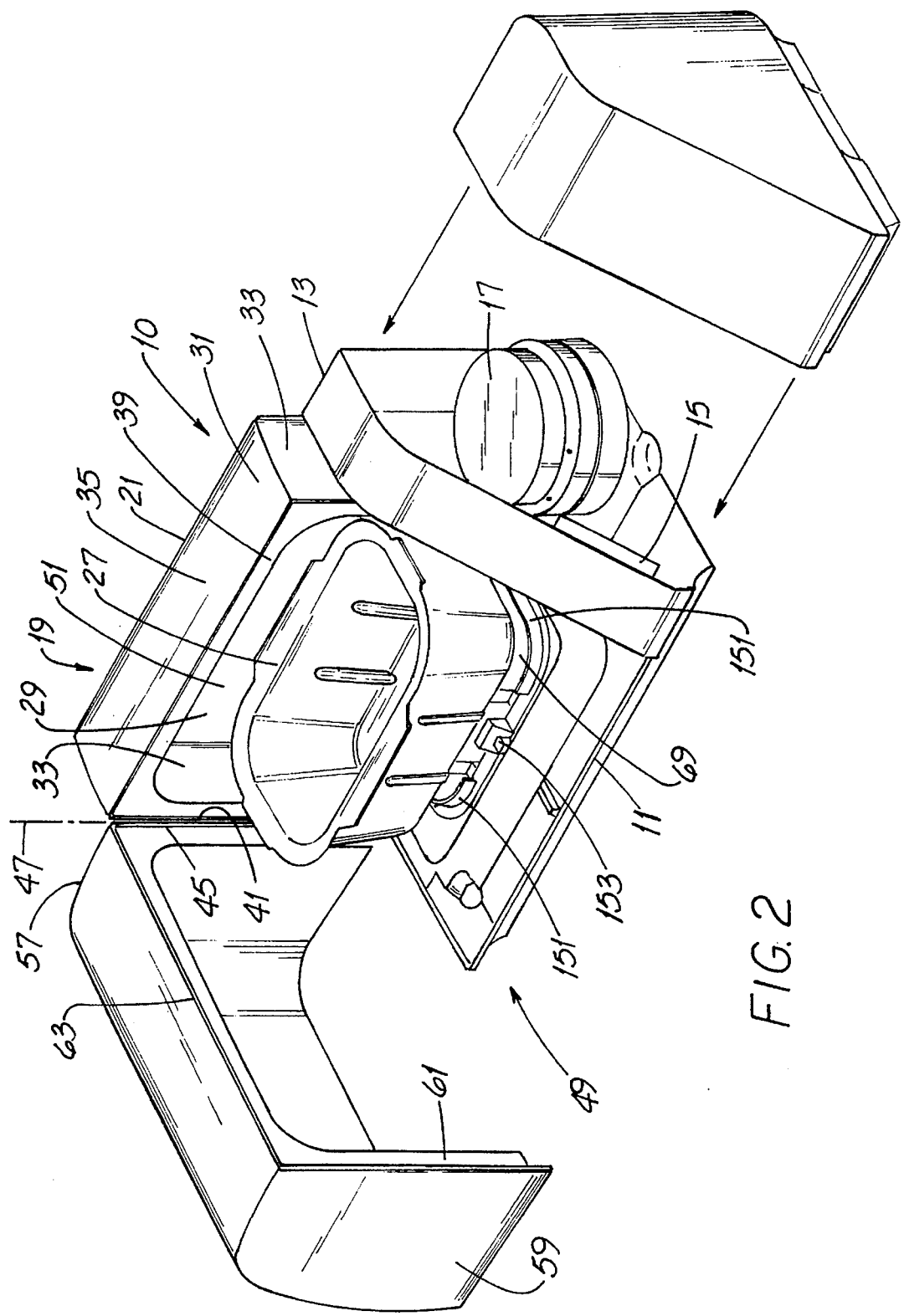
FIG. 2 is a perspective view of the breadmaker with the door open and the compartment cover removed.

Referring to FIGS. 1 and 2, the new automatic breadmaker 10 has a base or floor 11 and a compartment 13 atop the floor. Such compartment 13 encloses a controller 15 and a reversible electric motor 17. The controller 15 executes the operating cycle of the breadmaker 10 and as described in more detail below, the motor 17 powers kneading members which mix ingredients to make bread dough.

An oven chamber 19 is atop the floor 11, abuts the compartment 13 and is formed by the floor 11, a wall member 21 and an access door 23 having a window 25 allowing the user to view kneading and baking operations. A pan 27 for receiving ingredients mixed to make bread dough is mounted in the chamber 19.

The wall member 21 has a rear portion 29, a top portion 31 and lateral side portions 33, all of which are fixed, i.e., non-movable with respect to one another and to the floor 11. The surface 35 of the top portion 31 is at a first level 37 above the breadmaker floor 11 and the portions 31, 33 define a flat face which is substantially perpendicular.

The wall member 21 also has a vertical lateral edge 41 and a horizontal top edge 43, the latter located substantially directly above the pan 27 and extending along the pan length. In a highly preferred embodiment, the access door 23 is hinged to the wall member 21 along the front lateral edge 41 of the wall member 21 and along a rear lateral edge 45 of the door 23 and is pivotable laterally about a substantially vertical axis 47. Thus, the access door 23 swings in a substantially horizontal direction and creates a front opening 49 extending substantially to the floor 11, to the region above the pan and to the side portions 33.

The door 23 itself has a front surface 53 and a top surface 55, both of which are attractively curvilinear. There are also substantially flat first and second side surfaces 57, 59, respectively, the former having a substantially vertical rear edge 45. At least major portions of the top surface 55 and the first side surface 57 extend rearwardly from the front surface 53. The door 23 swings laterally for front opening without any door movement above the first level 37 and the resulting opening 49 extends substantially to the oven floor 11.

The portions 55, 57, 59 also define a flat face 61 which is substantially perpendicular and which abuts the face 39 of the wall member 21 when the door 23 is closed for baking. When the access door 23 is closed, it extends upwardly from along the oven floor 11 and curves rearwardly to a position directly above the pan 27. That is, the top edge 63 of the door 23 abuts the top edge 43 of the wall member 21 directly above the pan 27. When the door 23 is open, the breadmaker 10 has a very generous mouth area, open at the top as well as at the front and sides, so that insertion and removal of the pan 27 is further facilitated.

A laterally-swinging door 23 has advantages over a top-hinged door (a door hinged along its top edge), especially where a breadmaker occupies a place on a kitchen counter beneath cupboards, as is frequently the case. Such a door 23 swings substantially horizontally and permits multi-directional access to the oven chamber 19 with the door 23 away from the front of the breadmaker 10. Counter-to-cupboard spacing can prevent a top-hinged door from being fully opened and/or from staying open. The laterally-swinging door 23 also has advantages over a bottom-hinged door since when open, the latter protrudes outward toward the user and may impair easy access to the oven chamber.

Figure 3:
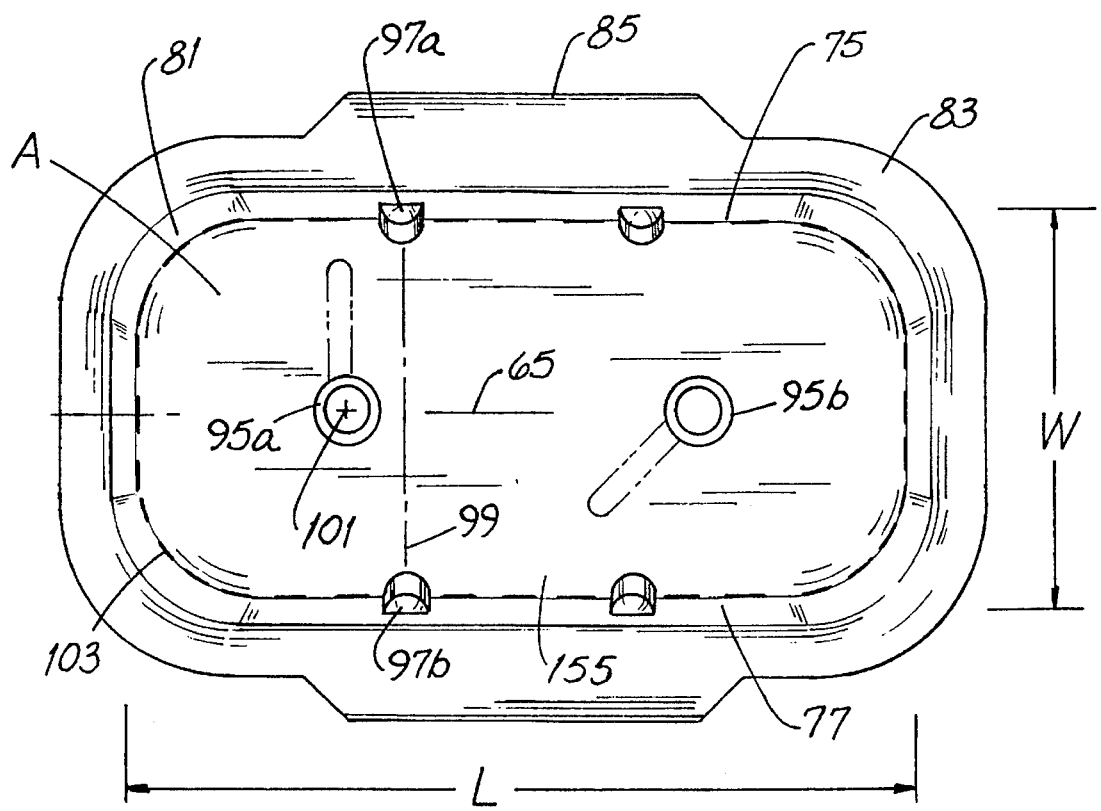
FIG. 3 is a top plan view of the new pan used with the breadmaker of FIGS. 1 and 2.

It is apparent from FIG. 2 that the oven floor 11 and the access door 23 are each longer than the pan 27. Such configuration accommodates "wide-side" insertion of the pan 27 into the chamber 19 and minimizes the height of the breadmaker 10. ("Wide-side" insertion means that the pan 27 can be inserted into the chamber 19 while holding the pan so that as shown in FIG. 3, its long axis 65 is generally parallel to the rear portion 29 of the wall member 21. There is no need to twist or turn the pan 27 during pan placement and removal.)

Referring now to FIGS. 1, 3, 4 and 5, features of the new breadmaker pan 27 will now be described. The new pan 27 has a bottom or base 67 supported atop a "foot-like" downwardly-extending rim 69. When the pan 27 is in place in the chamber 19, such rim 69 rests on the oven floor 11.

The pan 27 has first and second end panels 71 and 73, respectively, and first and second side panels 75 and 77, respectively. The panels 71, 73, 75 and 77 are substantially flat and extend upwardly from the base 67 at an angle thereto which is slightly greater than 90°. The pan 27 is thereby said to have "draft" so that the baked loaf can be easily removed therefrom by inverting the pan 27. The junctions 79 of the panels 71, 73, 75, 77 with the base 67 and the junctions 81 of the panels 71, 73, 75, 77 with one another are slightly curved and serve to give a shape to the finished loaf which closely resembles that of a normal bakery loaf made in a commercial bakery.

The top of the pan 27 is bounded by an outwardly-projecting lip 83 and a handle 85 juts from the lip 83 above each of the side panels 75 and 77. While the pan 27 may be grasped by the lip 83 anywhere around its perimeter, the handles 85 permit a more positive grasp which is of benefit when handling a hot pan 27 with insulated mitts, pads or the like.

The base 67 has a pair of bosses 87 spaced along the length of the pan 27. Each boss 87 has a shaft aperture 89 formed in it and a bearing 91 is mounted in each aperture 89 to receive a shaft 93 with slight sliding clearance. Such shafts 93 are linked to the motor 17, extend through the pan base 67 and drive the kneading members 95a, 95b.

The interior of the pan 27 includes a plurality of spaced-apart mixing ridges 97 extending generally between the base 67 and the lip 83. In a highly preferred embodiment, there are four ridges 97, i.e., a pair of ridges 97 for each kneading member 95. Each ridge 97 is linear in an up-down direction and has a generally semi-circular cross-sectional shape. Preferably, each opposed pair of ridges, e.g., ridges 97a and 97b as in FIG. 3, are on an axis 99 spaced slightly from the center axis 101 of the adjacent shaft 93. With kneading members 95 configured as described below, such members 95 will "clear" the ridges 97 when folded flat for baking at the conclusion of dough kneading.

It has been found that when the pan 27 is configured to produce a one- or one-and-one-half pound loaf of bread configured like a normal bakery loaf, the preferred number and placement of the ridges 97 is as described above. Such ridges 97 tend to keep the ball of bread dough centered in the pan 27 and such ball is less likely to undesirably "spin." And dough ingredients, e.g., flour, scour better from the curved pan junctions 81.

In another aspect of the invention, the pan 27 has a length L, a width W, an inside base area A (the area circumscribed by the overlay heavy dashed line 103) and a depth D. In a preferred embodiment, the ratio of length L to width W is greater than 1.5 and, most preferably, such ratio is greater than 1.8. Further, the ratio of depth D to inside base area A is preferably less than about 0.1 and, most preferably, is less than about 0.08. (It is noted that D and A are linear and area measurements, respectively. The ratios use numerical values without regard to units of measure.)

Figure 4:
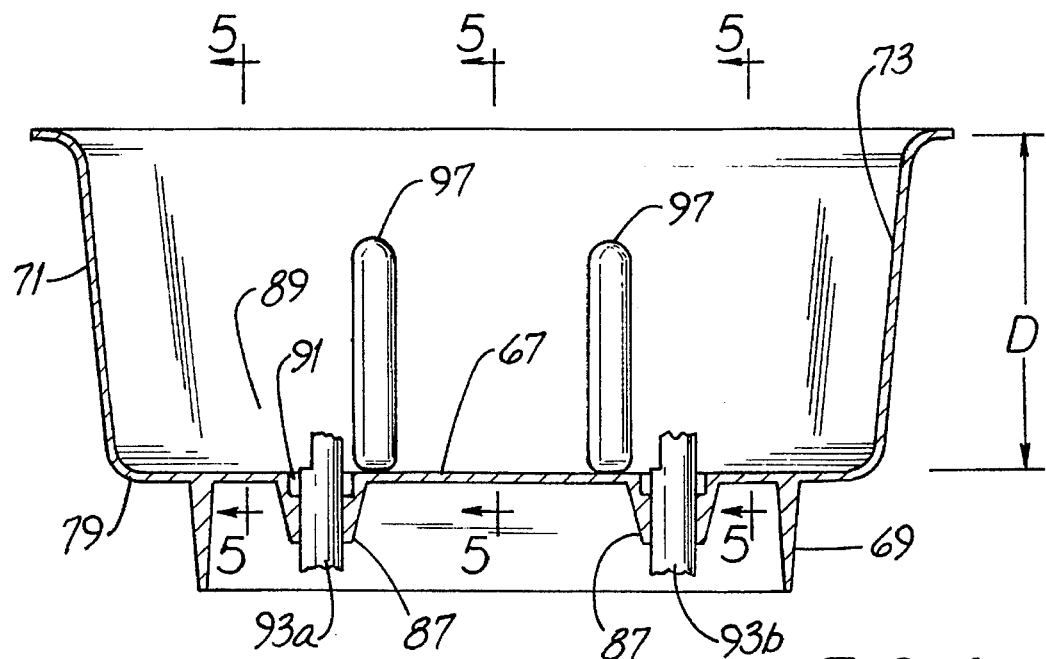
FIG. 4 is a cross-section side elevation view of the pan of FIG. 3.
Figure 5:
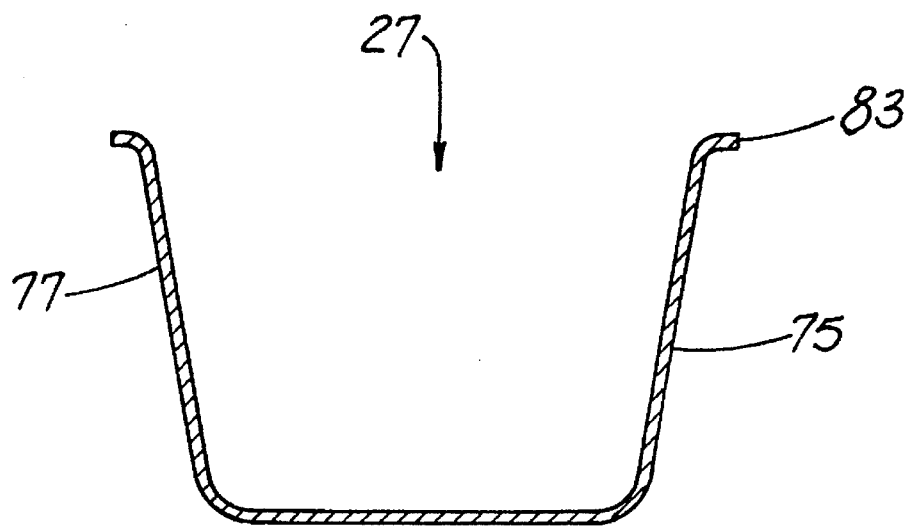
FIG. 5 is a cross-section view of the pan of FIG. 4 taken along any one of the viewing planes 5—5 thereof.

Referring particularly to FIGS. 4 and 5, another feature of the new pan 27 is that right cross-sectional configurations of the pan 27, i.e., the pan size and shape as viewed in cross-section at planes 5—5 at right angles to the long axis 65 of the pan 27 and at spaced locations along the pan length, are substantially constant. This feature also contributes to the fact that the loaf produced by the new breadmaker 10 has the appearance of a normal bakery loaf.

Figure 6:
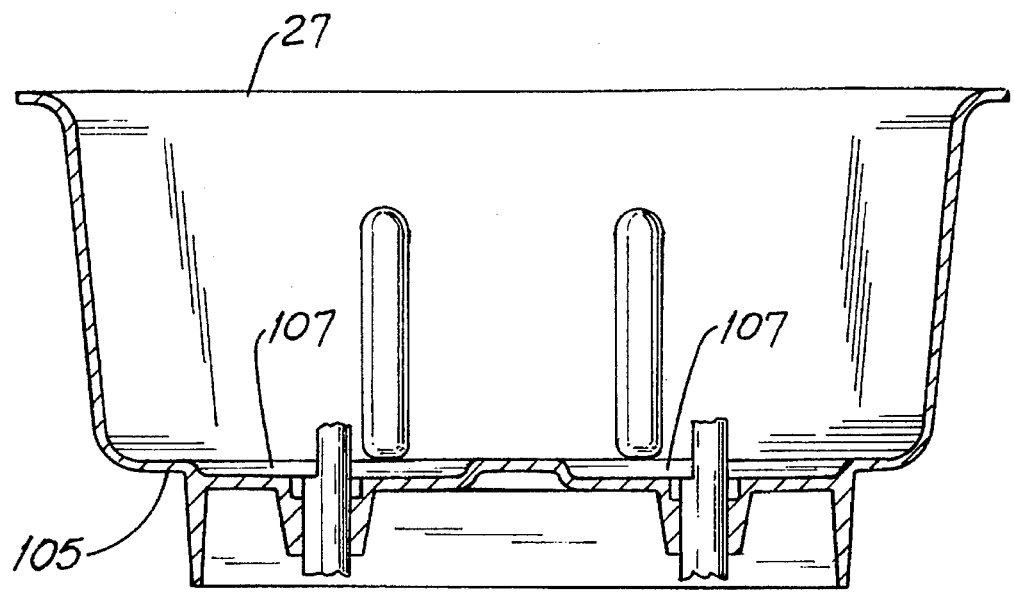
FIG. 6 is a cross-section side elevation view of a second embodiment of the pan of FIG. 3.
Figure 12:
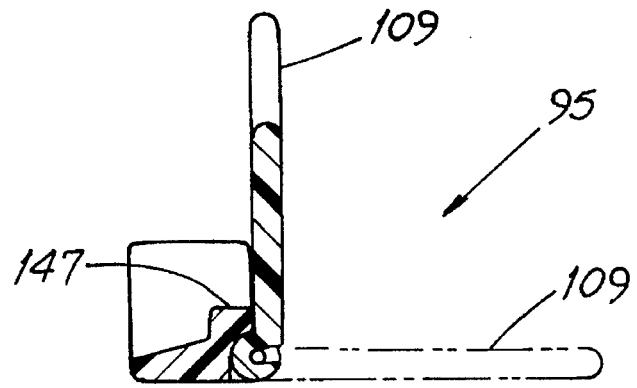
FIG. 12 is a section view of the kneading member taken generally along the plane 12—12 of FIG. 10.

Referring also to FIGS. 6 and 12, a second embodiment of the pan 27 includes a pan bottom 105 having a pair of recessed portions 107, each receiving one of the kneading members 95 described below. Preferably, each recessed portion 107 is of sufficient depth to fully receive the collapsed blade 109 of the kneading member 95. That is, when a blade 109 is folded flat as shown in dashed outline in FIG. 12, such blade 109 is "nested" in a recessed portion 107.

Figure 7:
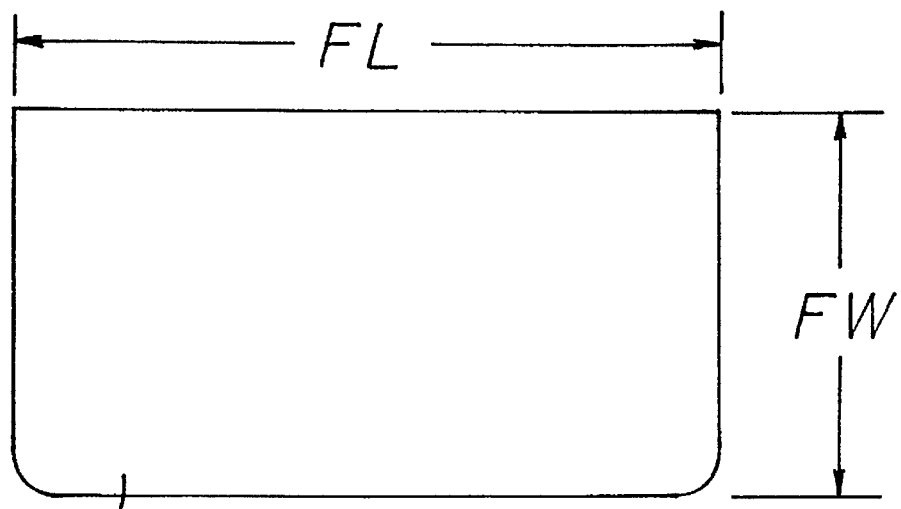
FIG. 7 is a representative top plan view of the floor of the new breadmaker.

Considering the oven floor 11 shown in FIGS. 1 and 7, such floor 11 has a floor length FL and a floor width FW. The preferred ratio of floor length FL to floor width FW is at least about 1.5 and most preferably, such ratio is at least about 1.8.

Figure 8:
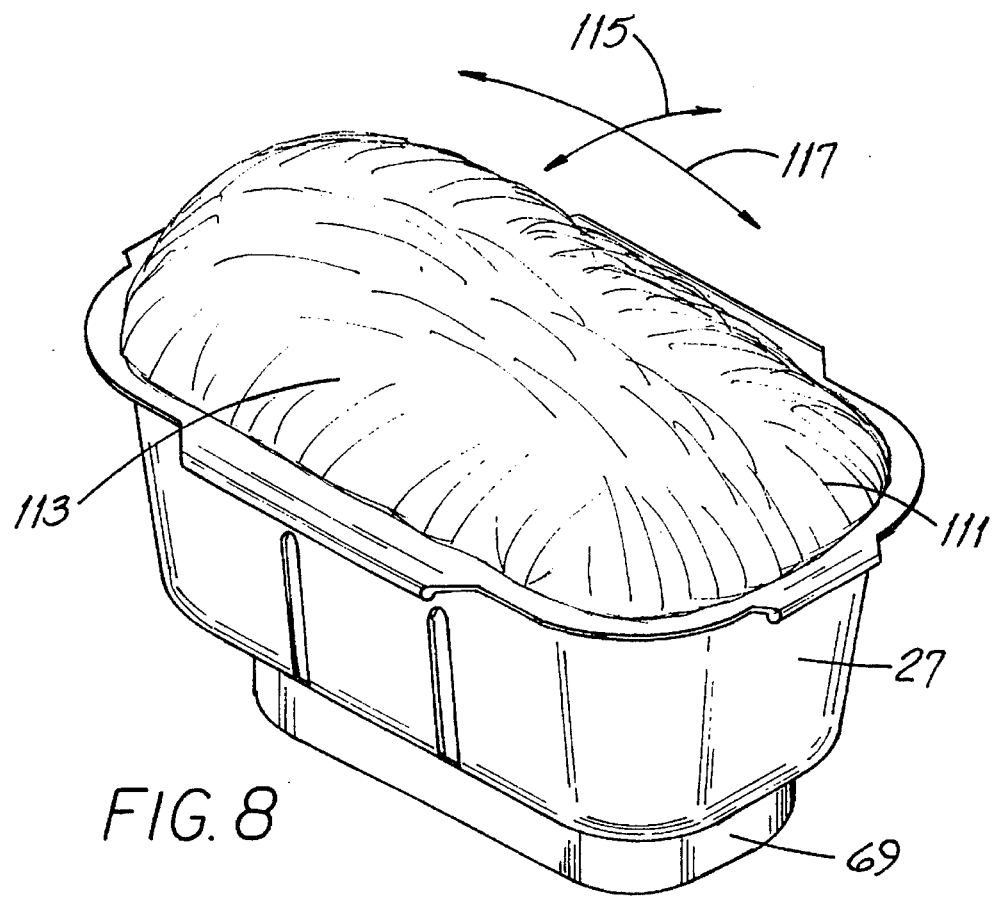
FIG. 8 is a perspective view of the pan of FIGS. 3, 4 and 5 shown in conjunction with a loaf of bread.
Figure 9:
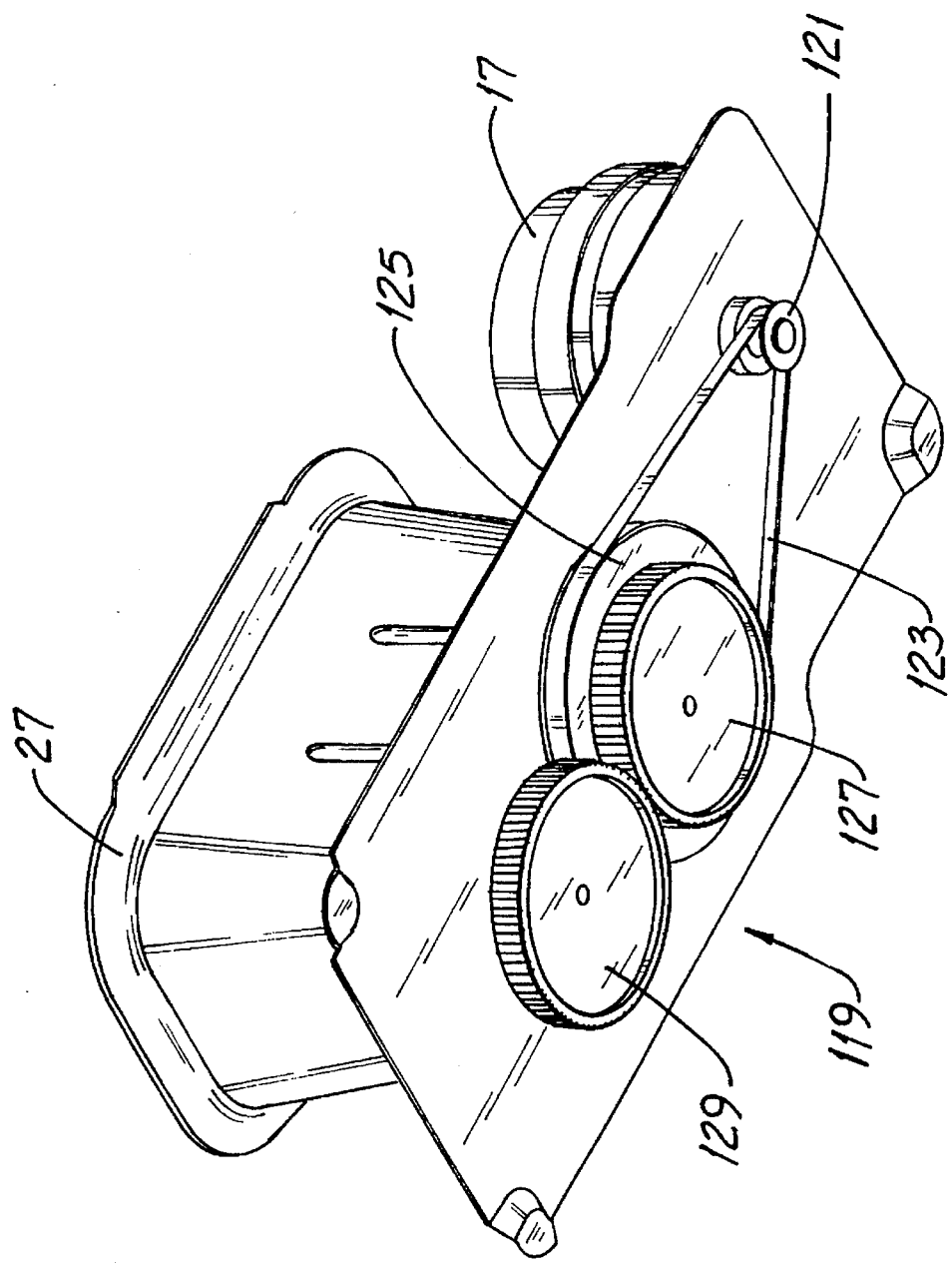
FIG. 9 is an underside perspective view of the arrangement for driving the kneading members of the breadmaker.
Figure 10:
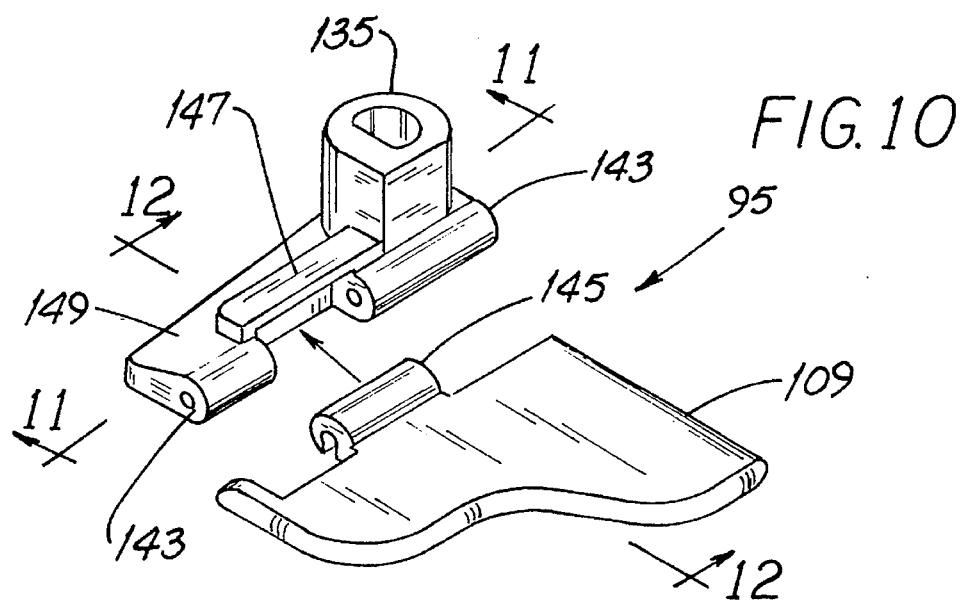
FIG. 10 is a perspective exploded view of a kneading member.
Figure 11:
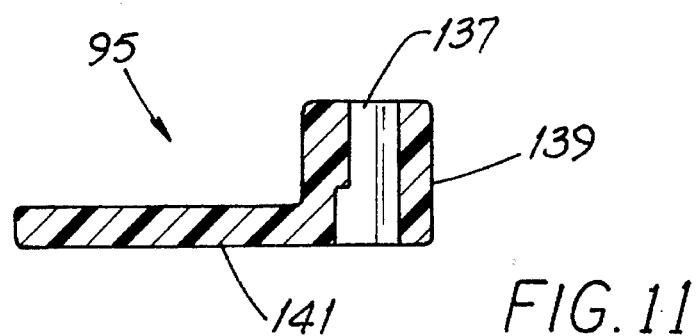
FIG. 11 is a section view of the kneading member taken generally along the plane 11—11 of FIG. 10.

From the foregoing and referring also to FIG. 8, it will be appreciated that the breadmaker 10 and its pan 27 produce a loaf of bread 111 in the configuration of a normal bakery loaf. That is, the loaf 111 has substantially flat ends and sides and a risen topside 113 extending along its length. As is characteristic of a normal bakery loaf, the loaf produced by the breadmaker is "crowned" or curved in two mutually-perpendicular planes as represented by the arrows 115 and 117.

Referring now to FIGS. 3, 4, 9, 10, 11 and 12 aspects of the kneading members 95 and how such members 95 are powered will now be described. The motor is coupled to means 119 for driving such members 95 and has a smaller-diameter driving pulley 121 attached to and rotating with the motor shaft. Such pulley 121 is linked by a belt 123 to a larger-diameter driven pulley 125 which rotates at a speed well below that of the pulley 121.

A first intermediate-diameter gear 127 is mounted on and concentric with the pulley 125 and, of course, rotates at the same speed as the pulley 125. The first gear 127 engages a second gear 129 which is also of intermediate diameter equal to that of the first gear 127. From the foregoing, it is apparent that for either direction of motor rotation, the gears 127, 129 rotate in opposite directions at the same speed.

The shaft 93a driving one of the kneading members 95a is concentric with the gear 129 and the shaft 93b driving the other kneading member 95b is concentric with the pulley 125 and gear 127. The shafts 93a, 93b are substantially parallel to one another and both shafts 93 rotate at the same speed which, of course, is much lower than the shaft speed of the motor 17.

Each kneading member 95 has a hub 135 with an opening 137 therethrough sized and shaped to fit its respective drive shaft 93 with slight sliding clearance. The opening 137 may be in the shape of the letter D or may have any other torque-transmitting shape, e.g., square or hexagon.

The hub 135 includes a grip member 139 to facilitate finger grasping and attachment of the kneading member 95 after the pan 27 is placed in the breadmaker 10 reparatory to ingredient mixing, dough kneading and baking. Each kneading member 95 includes a lower arm 141 extending radially outward from the hub 135 and having a kneading blade 109 pivotably pinned to it. Specifically, the arm 141 has a pair of radially-spaced tube-like portions 143 between which is received the portion 145 of the blade 109. The portions 143 and 145 are coupled together by a pin (not shown).

The arm 141 also has an abutment member 147 supporting the blade 109 at its upright position. Depending upon the direction in which a kneading member 95 is being driven, its blade 109 stands upright for mixing or kneading (and is supported there by the abutment member 147) or collapses by folding down for baking. (From the foregoing, it is apparent that the kneading members 95a, 95b are "mirror images" of one another so that the blades 109 of both are simultaneously upright or collapsed, notwithstanding that such kneading members 95a, 95b are being driven in opposite directions.)

The arm 14 has an edge surface 149 angled downward toward the pan base 67 and outward away from the portions 143, 145. When the member 95 is rotated in a direction which collapses the blade 109 as shown in dashed outline in FIG. 12, such surface 149 is of some help in urging dough ingredients, i.e., flour or the like, up away from the pan base 67. Better ingredient mixing results. Further, the kneading members 95a, 95b are spaced along the length of the pan 27 so that dough in the pan 27 will be reached by one or both of such members 95a, 95b.

In use, the pan 27 is placed (by "wide-side" insertion) into the oven chamber 19 and placement is so that the bottom support rim 69 of the pan 27 is between a pair of retention barriers 151 projecting upward from the floor 11. The barriers 151 and the support rim 69 are generally conformably shaped to one another so that the pan 27 is prevented by the barriers 151 from moving a significant distance in any direction.

A holding latch 153 is mounted on the floor 11 and has a tongue that projects into a slot in the pan rim 69. The latch 153 is spring-biased toward the rim 69 for pan holding during mixing and baking and is released by finger pressure at the conclusion of baking. The kneading members 95a, 95b are mounted on their respective shafts 93a, 93b and the ingredients then added to the pan 27.

Considering FIG. 3 particularly, the operating cycle is initiated and the motor 17 is operated in what is arbitrarily identified as the first or forward direction. So operated, the kneading members 95a and 95b counter-revolve, i.e., they are driven clockwise and counterclockwise, respectively, for several minutes to mix ingredients. During that time, the blades 109 are upright.

Next, the motor 17 is operated in the second or reverse direction for a time during which the kneading members 95a, 95b also counter-revolve and the blades 109 are collapsed. It has been found that brief reversal tends to pick up unmixed flour from the region 155 of the pan 27 that would not otherwise be properly mixed. Thereafter, the motor 17 is again operated in the forward direction and, finally, is operated in the reverse direction for a few seconds to collapse the blades 109 prior to baking.

There are advantages to using kneading members 95a, 95b which counter-revolve irrespective of the direction of motor rotation. One is that while the motor 17 is rotating in the forward direction and the blades 109 are upright, the dough ball tends to stay centered in the pan 27 between the members 95a, 95b. Another is that when the motor 17 is rotated in the reverse direction and the blades 109 are collapsed, loose flour in the region 155 is better incorporated into the dough ball.

After baking is complete, the door 23 is opened horizontally and the pan 27 removed in the same manner in which it was placed in the chamber 19, i.e., by "wide side" removal. As shown in FIG. 8, the resulting loaf 111 is of normal bakery loaf configuration and has a risen topside 113 extending along its length.

While the principles of this invention have been described in connection with specific embodiments, it should be understood clearly that these descriptions are made only by way of example and are not intended to limit the scope of the invention.

What is claimed is:

1. In an automatic breadmaker of the type having: drive means; an oven chamber formed by a floor and by top, front and side enclosing surfaces, the top surface at a first level above the floor; an access door which includes at least one of the enclosing surfaces; and a pan in the oven chamber with a kneading member therein linked to the drive means, the improvement wherein:

the access door includes the front surface and at least major portions of each of the top surface and a first side surface each extending rearwardly from the front surface, the first side surface having a substantially vertical rear edge; and the access door is hinged along its rear edge for front opening without any door movement above the first level;

whereby the access door is laterally swingable to permit multi-directional access to the oven chamber with the access door away from the front of the breadmaker.

2. The automatic breadmaker of claim 1 wherein:

the pan has a bottom which is longer than it is wide; and the oven floor and the access door are each wider than the length of the pan to accommodate wide-side insertion of the pan into the oven chamber;

thereby to minimize the height of the breadmaker.

3. The automatic breadmaker of claim 2 wherein the access door, when closed, extends upwardly from along the oven floor and rearwardly to a position directly above the pan, whereby insertion and removal of the pan when the access door is open is further facilitated.

4. The automatic breadmaker of claim 3 wherein the access door includes a window allowing a user to view kneading and baking operations.

5. The automatic breadmaker of claim 2 wherein the pan has a spread pair of the kneading members therein, thereby facilitating automatic preperation of a loaf of bread having a risen topside extending along its length.

6. The automatic breadmaker of claim 5 wherein the pair of kneading members are spaced along the length of the pan, whereby dough in the pan will be reached by one or both of the kneading members.

7. The automatic breadmaker of claim 1 wherein the access door is swingable in a substantially horizontal direction to open the oven chamber.

8. The automatic breadmaker of claim 7 wherein the access door is pivotable about a substantially vertical axis.

9. The automatic breadmaker of claim 1 wherein the access door includes a window allowing a user to view kneading and baking operations.

10. The automatic breadmaker of claim 1 wherein the access door, when closed, extends upwardly from along the oven floor and rearwardly to a position directly above the pan, whereby insertion and removal of the pan when the access door is open is further facilitated.

11. In an automatic breadmaker of the type having a base, a motor secured with respect thereto, an oven chamber formed by a floor, fixed enclosing surfaces and an access door, and a pan in the oven chamber having a motor-driven kneading member therein engageable to motor-linked drive means at the oven chamber floor, the improvement wherein:

one of the enclosing surfaces is a top portion at a level above the floor and the floor extends beyond the top portion;

the access door is laterally swingable for front opening of the oven chamber to create an opening extending substantially to the oven floor, thereby to facilitate insertion and removal of the pan.

12. The automatic breadmaker of claim 11 wherein:

the pan has a bottom which is at least about 1.5 times longer than it is wide; and the oven floor and the access door are each wider than the length of the pan to accommodate wide-side insertion of the pan into the oven chamber;

thereby to minimize the height of the breadmaker.

13. The automatic breadmaker of claim 12 wherein the access door, when closed, extends upwardly from along the oven floor and rearwardly to a position directly over the pan, whereby insertion and removal of the pan when the access door is open is further facilitated.

14. The automatic breadmaker of claim 12 wherein the pan has a spaced pair of the kneading members therein, thereby facilitating automatic preparation of a loaf of bread having a risen topside extending along its length.

15. The automatic breadmaker of claim 14 wherein the pair of kneading members are spaced along the length of the pan, whereby dough in the pan will be reached by one or both of the kneading members.

16. The automatic breadmaker of claim 11 wherein:

the access door has a front surface and a side surface extending rearwardly from the front surface and having a rear edge at the side of the breadmaker; and the access door is swingable about an axis along the rear edge to open the oven chamber.

17. The automatic breadmaker of claim 11 wherein:

one of the enclosing surfaces includes a wall member having a front lateral edge;

the floor has a front edge forward of the front lateral edge of the wall member; and the access door is hinged at the front lateral edge.

* * * * *